United States Patent [19]

Matsumoto et al.

[11] Patent Number: 5,051,187
[45] Date of Patent: Sep. 24, 1991

[54] PROCESS FOR RECOVERING SULFURIC ACID

[75] Inventors: Yukiei Matsumoto; Takanobu Hayashi, both of Kanagawa, Japan

[73] Assignee: Permelec Electrode Ltd., Kanagawa, Japan

[21] Appl. No.: 570,488

[22] Filed: Aug. 21, 1990

[30] Foreign Application Priority Data

Aug. 21, 1989 [JP] Japan .................................. 1-212936

[51] Int. Cl.$^5$ .............................................. C02F 1/26
[52] U.S. Cl. .................................... 210/639; 210/634; 210/748; 210/754; 210/756; 210/758; 210/759; 210/760; 210/912
[58] Field of Search ............... 210/634, 639, 748, 912, 210/754, 756, 758, 759, 760

[56] References Cited

FOREIGN PATENT DOCUMENTS 1-41394 9/1990 Japan .
1-41395 9/1990 Japan .

Primary Examiner—Stanely S. Silverman
Assistant Examiner—Krisanne Shideler
Attorney, Agent, or Firm—Sughrue, Mion, Zinn, Macpeak & Seas

[57] ABSTRACT

A process for recovering sulfuric acid from an aqueous sulfuric acid solution containing ferrous sulfate is disclosed, which comprises electrolyzing the aqueous sulfuric acid solution containing ferrous sulfate to thereby oxidize ferrous ion dissolved in the solution to ferric ion, and then removing the ferric ion by solvent extraction using a solvent and an extractant.

9 Claims, No Drawings

PROCESS FOR RECOVERING SULFURIC ACID

FIELD OF THE INVENTION

The present invention relates to a process for recovering sulfuric acid. More particularly, the present invention relates to a process in which sulfuric acid is recovered from the waste sulfuric acid generated from the production of titanium oxide by a sulfate process, utilizing electrolysis and solvent extraction.

BACKGROUND OF THE INVENTION

Titanium oxide is used in large quantity in various fields as a component of coating compositions, a delustering agent for chemical fibers, printing inks, cosmetics, etc. Processes for producing titanium oxide on an industrial scale are generally classified into two processes, namely, the sulfate process and the chloride process, and the former process has been mainly employed to date.

The sulfate process generally comprises the steps of (1) dissolving a titanium slag or raw ilmenite ore into sulfuric acid to obtain a titanium sulfate solution, (2) adding waste iron or waste aluminum to the titanium sulfate solution to chemically reduce ferric ion contained as an impurity in the solution to the divalent (ferrous) state in order to prevent precipitation of iron and to increase the degree of whiteness of the titanium oxide product, followed by cooling the solution to precipitate and remove ferrous sulfate, (3) heat-hydrolyzing the titanium sulfate solution from which ferrous sulfate had been removed, followed by precipitating hydrous titanium oxide, which is then filtered and washed, and (4) then calcining the washed hydrous titanium oxide at 800 to 1,100° C. to obtain anhydrous titanium oxide.

In the sulfate process described above, sulfuric acid solution is discharged in large quantity mainly in step (3) above. Treatment of this waste sulfuric acid has become a serious problem with respect to efficient use of resources, protection of the environment, etc. In the sulfate process, sulfuric acid is used in a unit amount (an amount to produce 1t of TiO$_2$) of about 3.5–5.0 t, and 1.0–1.5 t of the sulfuric acid is fixed as ferrous sulfate (step (2) above) in the case of production from ilmenite ore, with the remaining sulfuric acid being discharged as waste sulfuric acid.

The waste sulfuric acid contains a large amount of iron in addition to titanium, and further contains ions of titanium, manganese, aluminum, magnesium and other elements. Although part of the waste sulfuric acid is reused as ammonium sulfate, most of the waste sulfuric acid is presently disposed of in a landfill as gypsum, or discharged into the sea after first being neutralized. Thus, the waste sulfuric acid is treated at enormous cost.

On the other hand, investigations are being conducted relating to the reuse of recovered waste sulfuric acid for dissolving ores. However, the removal of divalent (ferrous) iron contained in the waste sulfuric acid is required, and the recovered waste sulfuric acid must be further concentrated. Since the solubility of iron in sulfuric acid is high, it is considered that a cost-saving and efficient method for removing ferrous ion contained in the waste sulfuric acid comprises oxidizing the ferrous (divalent iron) ion to ferric (trivalent iron) ion, and then removing the ferric ion by solvent extraction.

Conventional techniques for removing ferrous ion, however, are disadvantageous from a practical standpoint. For example, although ferrous ion is oxidized to ferric ion by exposure to air, the reaction proceeds extremely slowly and is inefficient. Ferrous ion is also oxidized by nitrogen oxides to obtain ferric ion, but the oxidation reaction yields nitric acid in the solution. The nitric acid corrodes the apparatus and disadvantageously oxidizes solvents and extractants used in the subsequent solvent extraction.

In the case where an aqueous hydrogen peroxide solution is used as an oxidizing agent, the divalent iron ion is quickly oxidized to the trivalent state, but is disadvantageous in that the reaction takes place vigorously and is dangerous because a large quantity of aqueous hydrogen peroxide solution is required. Furthermore, aqueous hydrogen peroxide solution is expensive, and the remaining hydrogen peroxide decomposes during solvent extraction, to thereby interfere with the solvent extraction.

SUMMARY OF THE INVENTION

An object of the present invention is to provide a process for efficiently and easily recovering sulfuric acid from a waste aqueous sulfuric acid solution which is generated in large quantity during the production of titanium oxide by the sulfate process, and which overcomes the above-described disadvantages of conventional recovery processes.

The process for recovering sulfuric acid in accordance with the present invention comprises electrolyzing an aqueous sulfuric acid solution containing ferrous sulfate generated in the production of titanium oxide by the sulfate process, to thereby oxidize ferrous ion dissolved in the solution to ferric ion, and then removing the ferric ion by solvent extraction. According to the process of the present invention, sulfuric acid is efficiently recovered from the waste aqueous sulfuric acid solution, and the recovered sulfuric acid solution is readily concentrated to a desired concentration for reuse in dissolving raw ores, or for other purposes.

DETAILED DESCRIPTION OF THE INVENTION

The process for recovering sulfuric acid from waste sulfuric acid resulting from the production of titanium oxide by the sulfate process according to the present invention is characterized in that ions of titanium, iron, manganese, aluminum, magnesium, etc. contained in the waste sulfuric acid are efficiently removed. Of the above noted metal ion contaminants, ferrous ion in particular is present in large quantity. Although the solubility of ferrous ion in sulfuric acid is high and removal of ferrous ion is most difficult, the present Applicants have discovered that substantially all the ferrous ion is removed along with other metal ions to readily recover the sulfuric acid, by electrolytically oxidizing the ferrous ion to ferric ion, and then subjecting the resulting electrolyzed solution to a solvent extraction treatment. The method of the present invention is characterized as removing ferrous ion from the waste sulfuric acid to reduce the ferrous ion concentration to about 50 ppm or less.

The anode used for the anodization reaction in the electrolysis treatment in the process of the present invention can comprise known insoluble anodes which are stable in sulfuric acid solution and which allow the following reaction to readily proceed: $Fe^{2+} \rightarrow F^{3-}$ ++e⊖ (reaction potential $E^0 = 0.77$ V). Examples of useful anode materials include carbon, graphite, platinum group metals, oxides of platinum group metals, oxides of other metals such as lead, composite materials made up of these metals and metal oxides, and materials obtained by covering corrosion-resistant substrates such as titanium, tantalum, etc. with the above noted metals or metal oxides.

The electrolysis treatment for anodization in the process of the present invention can be carried out without using a diaphragm. However, since non-diaphragm electrolysis results in a decrease in current efficiency at the cathode, electrolysis employing a diaphragm is advantageous with respect to current efficiency.

In non-diaphragm electrolysis, the voltage increase due to use of the diaphragm does not occur, such that the electrolysis is carried out at a lower cell voltage. For diaphragm electrolysis, neutral membranes made of ceramics, hydrocarbons, or fluorocompounds, and ion-exchange membranes made of hydrocarbons or fluorocompounds can be used as the diaphragm. Of those, however, a membrane having lower water permeability or better ion permeation selectivity is preferred. The electrolysis is preferably carried out at a current density of 50 $A/dm^2$ or less, with current densities between 1 to 30 $A/dm^2$ normally being advantageous for higher current efficiencies. If the current density exceeds 50 $A/dm^2$, oxygen is generated in an increased amount, resulting in a decreased current efficiency.

As an electrolytic cell for use in the present invention, an electrolytic cell comprising an anode and a cathode in the form of a perforated electrode, panel, strip, or rod, or an electrolytic cell comprising such electrodes fitted on plate-like substrates, e.g., an electrolytic cell having parallel flat plate-like electrodes can generally be used. Examples of other useful electrolytic cells include an electrolytic cell comprising a plurality of anode electrodes; an electrolytic cell of the forced slurry circulation type wherein the anode comprises a slurry of fine catalyst particles contained in the anolyte, and electrolysis is conducted while the slurry is forcibly circulated; a fixed-bed electrolytic cell wherein the anode comprises a three-dimensional electrode composed of large diameter electrode catalyst particles packed in an anode cell, and electrolysis is conducted while circulating the anolyte through the anode chamber; and a fluidized-bed electrolytic cell in which an anode chamber containing fine electrode catalyst particles dispersed or precipitated in the chamber is used, and an anolyte is passed through the anode chamber without forced circulation as in the fixed-bed electrolytic cell. The electrolytic cell equipped with parallel flat-plate electrodes is advantageous in that the cell can be constructed compactly so as to occupy less floor area than a multi-stage type electrolytic cell. However, in order to efficiently bring ferrous ion in the anolyte into contact with the anode to enhance current efficiency, the electrolytic cell equipped with a plurality of electrodes, the forced slurry circulation type electrolytic cell, the fixed-bed electrolytic cell, and the fluidized-bed electrolytic cell are advantageously used because the anodes in the above noted electrolytic cells have enlarged effective surface areas.

The electrolytic oxidation treatment in accordance with the process of the present invention is conducted at high current efficiency with good control of the electrolysis, when the concentration of ferrous ion is high (about 200 ppm or more). When the ferrous ion concentration has become low (about 100 ppm or less), chemical oxidation with an oxidizing agent can be carried out in combination with the electrolytic oxidation.

Useful oxidizing agents include ozone, oxygen, hydrogen peroxide, nitrogen oxides, chlorine, hypochlorous acid, and the like. Of these oxidizing agents, ozone, oxygen, and hydrogen peroxide are preferred because they do not leave undesired ions in the electrolyte or in the treated solution. With respect to solubility and the rate of oxidation reaction, hydrogen peroxide is most preferred. When chemical oxidation is conducted in combination with electrolytic oxidation, only a small amount of hydrogen peroxide or other oxidizing agent need be added, because the amount of ferrous ion contained in the solution being treated has been sufficiently reduced by electrolytic oxidation, and the oxidation reaction between the oxidizing agent and the remaining ferrous ion can be carried out mildly at low cost. The amount of the oxidizing agent added is generally an equivalent amount or slightly larger than ions to be oxidized.

The sulfuric acid solution which has undergone the electrolytic oxidation treatment is then subjected to a solvent extraction treatment, in which ferric ion and other metal ions are extracted by transferring the same to the solvent along with an extractant. Known techniques for solvent extraction can be used in the present invention, but the solvent used is preferably an organic solvent which is insoluble in aqueous sulfuric acid solution. Examples of such preferred solvents include cyclohexane, hexane, kerosene, xylene, toluene, carbon tetrachloride, chloroform, benzene, dichlorobenzene, dichloromethane, and the like.

As the extractant, a compound containing at least one functional group which forms a complex with ferric ion in the sulfuric acid solution, which complex is soluble in the solvent used for the extraction, is suitably used. Examples of such a functional group include phenol group, nitroso group, hydroxyl group, imino group, carbonyl group, carboxyl group, carbamic acid group, amino group, thiol group, thiocyano group, and pyridine group.

For use in the extraction of ferric ion from the waste sulfuric acid, benzene or chloroform is suitable as the solvent, but inexpensive kerosene is preferred when the extraction is conducted industrially on a large scale. As the extractant, thenoyltrifluoroacetone which is a β-diketone, and cupferron which has a nitroso group and a hydroxylamine group in its molecule, exhibit good extraction efficiency, but other ketones such as methyl isobutyl ketone and methyl ethyl ketone which are inexpensive, can also be used.

Furthermore, alkyl phosphates and alkylphosphine oxides such as tributyl phosphate and trioctylphosphine oxide can be used as a solvent extractant because they are inexpensive. A mixed solvent can also be used as the extraction solvent in order to modify the polarity of the solvent and to improve extraction efficiency. A combination of two or more extractants may also be used for the same purpose. Such a combined use of two or more extractants is also extremely effective in separating other metal ion contaminants which are contained in small amount along with the iron ion. The extracted ferric ion can be used, for example, as a raw material for ferrite after the solvent is recovered by evaporation, and the residual iron is calcined.

The recovered waste sulfuric acid solution from which iron ion and other metal ion contaminants have been thus removed generally has a sulfuric acid concentration of from 20 to 40 wt %. Since the recovered sulfuric acid solution is not sufficiently concentrated to dissolve raw ores such as ilmenite, the recovered solution may be concentrated by heating or other means to a concentration of 60 wt % or higher.

According to the process of the present invention wherein an aqueous sulfuric acid solution containing ferrous sulfate is electrolyzed to oxidize ferrous ion dissolved in the solution to ferric ion and the ferric ion is then removed by solvent extraction, sulfuric acid is efficiently and readily recovered from the waste aqueous sulfuric acid solution discharged in the production of titanium oxide by the sulfate process. Therefore, the process of the present invention is of significant utility with respect to effective exploitation of resources and the protection of environment.

The present invention is described below in detail by reference to the following Examples, which are not to be construed as limiting the scope of the invention.

EXAMPLE 1

Electrolytic oxidation of ferrous ion to ferric ion was carried out using an electrolytic cell comprising an anode chamber containing 1 liter of a 20 wt % aqueous sulfuric acid solution as representative of a waste solution containing ferrous sulfate (20 g/l in terms of iron ion concentration); a cathode chamber containing 1 liter of 20 wt % aqueous sulfuric acid solution; a metallic anode comprising a titanium base covered with ruthenium oxide; a cathode constituting a steel (SUS304) plate, and a diaphragm composed of a hydrocarbon-based polymer membrane ("Yumicron Membrane" manufactured by Yuasa Battery Co., Ltd., Japan). Electrolysis was conducted at room temperature by applying an electric current at a current density of 10 A/dm$^2$ for 3 hours.

For the purpose of comparison, the ferrous ion contained in the same aqueous sulfuric acid "waste" solution as used in Example 1 above, was converted to ferric ion by either (1) gradually adding about 20 ml of 35% aqueous hydrogen peroxide solution to the sulfuric acid solution (Comparative Example 1), or (2) blowing nitrogen oxides generated by contacting nitric acid with copper through the sulfuric acid solution until ferrous ion was not detected (Comparative Example 2).

Each (200 ml) of the above-obtained three kinds of solutions containing ferric ion were subjected to solvent extraction with 60 g of thenoyltrifluoroacetone and 200 ml of benzene as an extractant and solvent, respectively. Thereafter, the solvent was separated with a separatory funnel, and the iron ion concentration of each aqueous sulfuric acid solution, i.e., each residual aqueous phase, was determined.

The results obtained are shown in Table 1.

TABLE 1

|  | Example 1 | Comparative Example 1 | Comparative Example 2 |
| --- | --- | --- | --- |
| Oxidation method | Electrolysis | H$_2$O$_2$ addition | NO$_x$ blowing |
| Fe ion concentration | 50 ppm | 2,050 ppm | 1,800 ppm |

The results in Table 1 show that according to the process of the present invention, iron ion is effectively removed, and sulfuric acid is effeciently recovered.

EXAMPLE 2

A small amount (about 0.1 ml) of aqueous hydrogen peroxide solution was added to the solution obtained as a result of the electrolytic oxidation in Example 1, to thereby substantially completely convert the remaining ferrous ion to ferric ion. The resulting solution was subjected to solvent extraction in the same manner as in Example 1. The thus-obtained sulfuric acid solution was analyzed for iron ion concentration, which was found to be 10 ppm.

EXAMPLE 3

Electrolytic oxidation of ferrous iron ion to ferric ion was carried out using an electrolytic cell comprising an anode chamber containing 1 liter of 40% aqueous sulfuric acid solution containing ferrous sulfate (40 g/l in terms of iron ion concentration); a cathode chamber containing 1 liter of 40% aqueous sulfuric acid; an anode prepared by packing spherical graphite particles having a diameter of 10 mm into a titanium basket;, a cathode made of a steel (SUS316), and a diaphragm made of a fluorocompound-based cation-exchange membrane. Electrolysis was conducted for 5 hours at the same current density as in Example 1.

For purposes of comparison, treatment with 40 ml of aqueous hydrogen peroxide solution (Comparative Example 3) and blowing of nitrogen oxides (Comparative Example 4) were conducted in the same manner as in Comparative Examples 1 and 2.

Each (200 ml) of the three kinds of solutions thus treated and containing ferric ion were subjected to solvent extraction with 70 g of cupferron and 400 ml of kerosine as extractant and solvent, respectively. Thereafter, the resulting solutions were treated in the same manner as in Example 1, and the iron ion concentration of each aqueous sulfuric acid solution was determined.

The results obtained are shown in Table 2.

TABLE 2

|  | Example 3 | Comparative Example 3 | Comparative Example 4 |
| --- | --- | --- | --- |
| Oxidation method | Electrolysis | H$_2$O$_2$ addition | NO$_x$ blowing |
| Fe ion concentration | 4 ppm | 580 ppm | 3,460 ppm |

While the invention has been described in detail and with reference to specific embodiments thereof, it will be apparent to one skilled in the art that various changes and modifications can be made therein without departing from the spirit and scope thereof.

What is claimed is:

1. A process for recovering sulfuric acid from an aqueous sulfuric acid solution containing ferrous sulfate, which comprises electrolyzing the aqueous sulfuric acid solution containing ferrous sulfate to thereby oxidize ferrous ion dissolved in the solution to ferric ion, and then removing the ferric ion by solvent extraction using a solvent and an extractant.

2. A process as in claim 1, wherein the electrolysis is conducted at a current density of 50 A/dm$^2$ or less.

3. A process as in claim wherein the current density is from 1 to 30 A/dm$^2$.

4. A process as in claim 1, wherein the electrolysis is conducted in the presence of an oxidizing agent.

5. A process as in claim 4, wherein the oxidizing agent is selected from ozone, oxygen, hydrogen peroxide, nitrogen oxide, chlorine and hypochlorous acid.

6. A process as in claim 1, wherein the solvent used in the solvent extraction is selected from cyclohexane, hexane, kerosene, xylene, toluene, carbon tetrachloride, chloroform, benzene, dichlorobenzene and dichloromethane.

7. A process as in claim 1, wherein an extractant used in the solvent extraction is a compound containing at least one functional group which forms a complex with ferric ion in the sulfuric acid solution, the complex being soluble in the solvent used for the extraction.

8. A process as in claim 7, wherein the functional group is selected from a phenol group, nitroso group, hydroxyl group, imino group, carbonyl group, carboxyl group, carbamic acid group, amino group, thiol group, thiocyano group and pyridine group.

9. A process as in claim 7, wherein the extractant is selected from thenoyltrifluoroacetone, cupferron, methyl isobutyl ketone and methyl ethyl ketone.

* * * * *